(12) United States Patent
Marshall (10) Patent No.: US 6,474,992 B2
(45) Date of Patent: Nov. 5, 2002

(54) REFERENCE TRAINING TOOLS FOR DEVELOPMENT OF READING FLUENCY

(76) Inventor: Tawanna Alyce Marshall, P.O. Box 1589, Temple Hills, MD (US) 20757

( * ) Notice: Subject to any disclaimer, the term of this patent is extended or adjusted under 35 U.S.C. 154(b) by 40 days.

(21) Appl. No.: 09/756,760

(22) Filed: Jan. 10, 2001

(65) Prior Publication Data

US 2001/0003039 A1 Jun. 7, 2001

Related U.S. Application Data

(63) Continuation-in-part of application No. 09/401,334, filed on Sep. 23, 1999.

(51) Int. Cl.[7] .............................................. G09B 17/00
(52) U.S. Cl. ....................................... 434/167; 434/178
(58) Field of Search ................................ 434/159, 167, 434/168, 169, 170, 171, 172, 173, 174, 175, 176, 178

(56) References Cited

U.S. PATENT DOCUMENTS

| | | | | |
|---|---|---|---|---|
| 3,242,596 A | * | 3/1966 | Smith .......................... 434/349 |
| 3,426,451 A | * | 2/1969 | Hoffman ...................... 434/178 |
| 3,670,427 A | * | 6/1972 | Stolpen ....................... 434/157 |
| 3,715,812 A | * | 2/1973 | Novak ......................... 434/170 |
| 4,124,943 A | * | 11/1978 | Mitchell ................. 434/307 R |
| 4,193,212 A | * | 3/1980 | Al-Kufaishi ................. 434/178 |
| 4,544,360 A | * | 10/1985 | Goodman .................... 434/178 |
| 4,609,357 A | * | 9/1986 | Clegg .......................... 434/167 |
| 4,655,713 A | * | 4/1987 | Weiss .......................... 434/178 |
| 4,768,959 A | * | 9/1988 | Sprague ....................... 434/156 |
| 5,429,513 A | * | 7/1995 | Diaz-Plaza .................. 434/167 |
| 5,558,520 A | * | 9/1996 | Werzberger ................. 434/317 |
| 5,934,708 A | * | 8/1999 | Batjuk .......................... 283/46 |
| 6,024,571 A | * | 2/2000 | Renegar ...................... 434/157 |
| 6,126,447 A | * | 10/2000 | Engelbrite ................... 434/167 |

\* cited by examiner

*Primary Examiner*—Derris H. Banks
*Assistant Examiner*—Kurt Femstrom (57) ABSTRACT

This invention of booklet, bookmark and audio storage device, relates to training youth and adult readers considered normal, in the use of materials and reference tools in their development of fluency using the instructional method of the prior related invention and the configuration of categories of information, activities and experiences deemed as necessary for the development of such materials and tools. These materials and tools use special markings for directing readers in word pronunciation while leaving in tact the correct spelling of text in the booklet and uses both correct and phonetic spelling on the reference tool as a means of aiding pronunciation of letter combinations and sight words that do not decode phonetically. The audio storage device aids the reader in objectively evaluating fluency. The materials and tools have been designed to be accessible, economical, highly portable, and inconspicuous as a means of protecting the reader's self esteem. This invention is further designed to be used independent of other resources, helpers or equipment beyond that associated with this invention.

7 Claims, 4 Drawing Sheets

FIG.1

THIS MĀY bē prevented by 'ūsing

N<u>ew</u> York, N.Y.

NŌTES

Spācé 'limits dis'cus<u>sion</u>

N<u>ew</u> York, N.Y.

The    'Furniture    'Windōws

FIG. 6

Yóū can smīlé moré; yóū just fēēl 'happi<u>er</u>.
'Pēóp<u>le</u> nēēd to know h<u>ow</u> to 'han<u>dle</u>
ex'cep<u>tions</u> to <u>the</u> norm.

REFERENCE TRAINING TOOLS FOR DEVELOPMENT OF READING FLUENCY

CROSS-REFERENCE TO RELATED APPLICATIONS

This invention relates to a continuation-in-part application Ser. No. 09/401,334, filed Sep. 23, 1999 of method and materials for teaching the phonetic code and repairing self esteem.

REFERENCE TRAINING TOOLS FOR DEVELOPMENT OF READING FLUENCY

"A portion of the disclosure of this patent document contains materials which is subject to copyright protection The copyright owner has no objection to the facsimile reproduction by anyone of the patent document or the patent disclosure, as it appears in the patent and trademark office patent files or records, but otherwise reserves all copyright rights whatsoever."

STATEMENT REGARDING FEDERALLY SPONSORED RESEARCH OR DEVELOPMENT

Not Applicable

REFERENCE TO A MICROFICHE APPENDIX

Not Applicable

BACKGROUND

For decades, the media has reported on the enormous reading problem among all age groups in the USA. A variety of methods, materials and equipment have been used to address the reading problem. This invention is directed primarily at non disabled youth and adult readers who learned the phonetic code taught in the prior related invention. After that instruction, readers were encouraged to reference the dictionary when attempting to pronounce sight words, defined here as words whose pronunciation is not supported by their spelling and by the method of the prior related instruction, to identify silent letters and other anomalies of word construction, and for verification of word pronunciation when there was a question regarding vowels being long or short, and on which syllable the stress should be placed. By combining information of the prior instructional method with that available in the dictionary, readers were advised to practice as a means of developing fluency. That method of gaining fluency that was separate from the original instructional method, was seen as one with life long benefit because it will be used repeatedly as the vocabulary expands.

Problems surfaced because some developing readers have few books in their homes that can be used as practice materials and no dictionaries that can provide necessary reference information. Moreover, most had never developed habits of visiting the library to avail themselves of the same. Hence, practice opportunities were limited from the outset because of the dearth of readily available literature, both for reading and for reference. More often than not, helpers who might substitute for reference materials, were unavailable. When helpers and reference materials are non existent, practice efforts and development of fluency suffer.

Even when dictionaries were present in the school and home, some readers experienced frustration with practice efforts because they were inept at applying research techniques needed to find and compare dictionary spellings and pronunciations with the words they wanted to read. Because of this, the rate of progress in developing reading fluency was slower than had been expected. The process of practicing reading and using reference tools was poorly tolerated. The result was an erosion of reading skill over time.

The need arose for quicker methods and easy-to-use materials that would help readers transition to using standard reference tools as a means of achieving reading fluency. These needed to be self help materials and tools that would remind readers of information regarding proper letter and word pronunciations while addressing the issue of word "exceptions", those being sight words and special letter combinations, the pronunciation of which is not supported by their spelling, and do it in ways compatible with the method of instruction and goals of the prior related invention. Additionally, these youth and adult readers would want the process to involve as little fan-fare as possible, meaning the materials should be capable of being used in private or done without the reader's efforts being noticed by others, as a means of preventing embarrassment that could damage self esteem.

Problems in using inventions of the prior art to meet the present needs were numerous, the extent of which is seen by comparing the limitations of each with the objects for which this invention was designed as noted later. Of note is the fact that few inventions of the prior art are designed to be used by the specific population of normal youths and adults targeted by this invention. None were suitable in reinforcing the method of reading instruction of the prior related invention. Also, none assisted the reader in learning to use reference tools specifically, or to readily transfer those skills into use with standard resource materials. Those methods and materials that alluded to development of fluency, accomplished the task by using the same materials and methods to repeat the original instruction until the reading pace, etc. improved. This invention seeks to present the method for achieving fluency in a different presentation from that of the original instruction but one that compliments the original instruction, so that the reader will remain motivated in progressing toward the goal and not think that achievement of fluency is the same as learning the rudiments of reading over again. Other problems in considering methods such as those of Hoffman, U.S. Pat. No. 3,426,451, who uses altered fonts to guide readers in pronunciation of letters, and Wood, U.S. Pat. No. 5,328,373, who uses sound letters as guides for phonetic decoding of letters, would involve the reader in learning a new basic instructional method before being able to use such inventions, and/or the reader would need to rely on major equipment, that would modify original text as a means of making it readable such as may be used with Anderson's translator and dictionary, U.S. Pat. No. 4,579,533, or Miller's invention, U.S. Pat. No. 5,366,377, that deletes "sight words", defined as common words, from the text thereby forcing deciphering of the remaining words that can be decoded phonetically, but which equipment to effect these changes may be unavailable to the reader.

This invention of reference training materials and tools consists of a booklet, bookmark and audio storage device, hereafter referred to as the "tape." The booklet and bookmark have been marked in ways that bring some of the information, normally learned by researching, directly to the booklet text, and supply other reference information on the bookmark. The markings used in this embodiment, are inconspicuous as is the general appearance of all of the materials and tools so as to protect the self esteem of the reader. After the reader has used the marked booklet and bookmark to determine correct pronunciation of words, the tape is used to evaluate achievement of fluency.

Along with teaching the phonetic code, the prior related instruction also taught phonetic spelling as contrasted with correct spelling. Walker, U.S. Pat. No. 5,421,731, and others teach correct spelling along with reading, but do not appear to acknowledge or appreciate the role of phonetic spelling as an aid to reading. Hoffman, U.S. Pat. No. 3,426,451, decried the teaching of non traditional spelling, as have others, saying that it makes reading more difficult when the person attempts to read correctly written words. Nevertheless, readers and speakers need to know phonetic spelling when attempting to pronounce proper names of businesses, products and especially names of people whose original language is not English, which names have been phonetically spelled when translated into English. Often these names "do not follow the rules" associated with the spelling of traditional English words. The dictionary, a standard reference tool, also uses phonetic spelling to illustrate pronunciation of some words, particularly sight words, and for pronunciation of word syllables that do not decode phonetically when written correctly.

Unless the reader understands the connection between phonetic spelling and the use of reference tools such as dictionaries, there will remain a sense of helplessness in approaching the task of reading where sight words, and other variations of letter combinations exist that defy phonetic decoding. Readers need to know that phonetic decoding skills and skill in applying and interpreting phonetic spelling are vital despite the presence of sight words in the text. They need not fear any word even if they have never heard it pronounced, provided they understand and can use phonetic spelling, while maintaining their understanding of letter sounds, vowel markings, and syllable emphasis, as taught in the prior related invention. The person who knows how to spell phonetically, and pronounce phonetically written words, is not dependant upon a person or person substitute, such as a tape or synthesized voice, for learning pronunciation of the word that cannot be decoded phonetically but which is spelled phonetically in a reference source as a means of explaining its pronunciation. By learning to use reference tools, such as the dictionary with its phonetic spelling, readers who learned the method of the prior instruction can feel confident in being able to pronounce all words correctly.

These reference training tools help make that important connection with and transition to standard reference tools with their use of phonetic spelling. This invention reminds readers of syllable emphasis, letter sounds, and the meaning of vowel markings, and demonstrates the legitimate use of phonetic spelling by incorporating it into information used on the bookmark reference training tool.

This invention also overcomes the problem anticipated by Hoffman by showing both the correct and the phonetic spelling of words. The sight words and letter combinations that must be researched further to learn their correct pronunciation, are identified in the booklet, then repeated in the bookmark reference tool where some are illustrated with phonetically spelled versions of the words that represent the correct pronunciation of the same.

This invention, as with the prior related instruction, is designed for use primarily with "normal" youth and adult readers who had previously failed in their attempts at learning to read. The present invention follows up on the need to protect and preserve restored self esteem as the reader meets new reading challenges, this one being development of fluency. Prior inventions appeared not to concern themselves with the reader's reaction to the learning processes or materials beyond recognition of the role of motivation and that of labeling the materials as being "interesting" or "boring," and because of that, were again deemed unsuitable for use with this population owing to features of those inventions that would have caused damage to the reader's self esteem.

Objects of the present invention are to:

provide materials and tools for development of fluency that support the instruction of the prior related method as a means of preventing erosion of reading skills and preventing the reader's having to relearn other instructional methods that could be time consuming thereby becoming a source of discouragement, and provide reference training materials and tools primarily for normal youth and adult readers with features that are transferable such that by using them the reader is prepared to apply the same learning and techniques in the use of standard reference materials and, provide self help materials and tools that can be used independently without assistance from other helpers or resources such as dictionaries, computers and other such equipment, beyond that of this invention, and provide materials and tools that are portable and economical, the latter insuring availability, and provide materials and tools that can be used in all settings by the design incorporating privacy for the user, and provide reference training materials and tools in the form of a booklet, bookmark and audio storage device, and provide materials and tools that enable readers to move quickly between the reading matter and the reference tools, and keep the booklet text in tact with correct spelling of words, standard type and spacing, and demonstrate the legitimate use of phonetic spelling, particularly in reference type resources, and visibly mark the groups of letters and words in the materials and tools that are designated as long vowels, short vowels, consonants, special letter combinations, sight words, silent letters in words, and the syllable on which stress is placed, as a means of making it easier for the reader to determine correct pronunciation of the same and for easing the reader's research burden, and provide materials and tools that protect the self esteem of youth and adult readers, accomplished in part by such materials and tools being small, plain looking and inconspicuous in overall appearance and by the use of markings that are inconspicuous.

Another object was to provide materials and tools that could be adapted for use by younger children that are not disabled whose self esteem may not have been damaged, and who could be served better by the use of elements such as enlarged marks, color, and/or other changes that would make these materials and tools more interesting and would hasten learning in the area of reading using the phonetic code while training in the use of reference tools with a goal of achievement of fluency.

BRIEF SUMMARY

The present invention of reference training materials and tools, builds on the prior instruction, further developing newly acquired reading skills through helping readers acquire fluency, thereby preventing erosion of reading skills. It reminds readers to apply their knowledge of the phonetic code relative to pronunciation of letters and words, and by resorting to reference tools, add information about specific letter combinations and words, such as sight words. It does this by first designating categories of information deemed as necessary for developing fluency and uses inconspicuous markings of the letters and words in some of those categories and groups as reminders of how such letters and words should be pronounced or treated. The markings are matched on the bookmark that shows alphabetized letter and word groupings that include correct and phonetic spellings which explain pronunciation of words that do not decode phonetically. The audio device allows the reader to match reading speed and voice inflection as an objective evaluation of the achievement of fluency. These printed and audio materials and tools, become a complete package of quick and easy reference tools that gives the reader independent control over learning pronunciation of words without resorting to helpers or any other reference sources for help with development of reading fluency. These materials and tools are psychologically acceptable to "normal" youth and adults by being inconspicuous and designed to minimize threats to the reader's self esteem, all of which create a safe practice experience and support the self esteem repair objectives of the prior and present invention. The materials are small and lightweight to insure portability and economical to ensure availability. Skill developed in using these reference training tools helps assure that future growth in reading will not be impeded by resistance to what was previously perceived as an "interference" with reading efforts.

DETAILED DESCRIPTION OF THE INVENTION

This invention provides readers with reference training materials and tools as a means of developing reading fluency while using skills in phonetic decoding of words as taught in the prior related method of instruction. It is capable of protecting the self esteem of youth and adult readers and can be used independent of help from others or from resource materials and equipment beyond that of this invention.

Considering the objects of the invention as noted earlier, it was decided that reference training materials and tools could be designed best by identifying and arranging information, activities, and experiences into categories deemed as necessary for development of reading fluency, those being:

1) awareness of silent letters in words
2) correct pronunciation of letters and words grouped as:
   a) long vowels, b) short vowels,
   c) consonants, d) special letter combinations including letter blends and
   e) sight words, defined as words that are pronounced in ways not supported by their spelling and phonetic decoding methods of the related invention that must be researched to learn their correct pronunciation,
3) knowing on which syllable the emphasis should be placed
4) opportunity for relating to reference information organized into visually identifiable categories, which categories may include:
   a) "old information" defined as information taught in the prior instructional method that pertained to:
      i) correct placement of syllable emphasis,
      ii) correct pronunciation of long vowels,
      iii) correct pronunciation of short vowels,
      iv) correct pronunciation of consonants, and
      v) correct pronunciation of a limited number of special letter combinations,
   b) "new information" defined as that information gained by researching the bookmark reference training tool, about which the prior instructional method supplied limited or no information, and which information may be marked with a common marking such as the underline, an example being information pertaining primarily to correct pronunciation of groupings of letters identified as special letter combinations and/or sight words,
   c) "direct information" defined as information supplied through markings that so direct the reader's response that resorting to use of the bookmark reference tool as a means of determining correct pronunciation of letters and words may not be necessary, with an example being a mark applied directly to text in the booklet indicating the syllable on which stress should be placed, and
   d) "indirect information" defined as information requiring more than one step application, and/or that derived from deduction regarding the relationship of markings applied to letters and words and correct pronunciations of the same, such as that necessary for knowing when a vowel is short which may happen by contrasting a marked vowel designated as long with an unmarked vowel that would be designated as short by virtue of it not being long because it is not marked,
5) opportunity for relating to information in reference training materials and tools such that steps in the search process are reduced and
6) knowing by, objective evaluation, when reading is classified as fluent.

Figure 1:
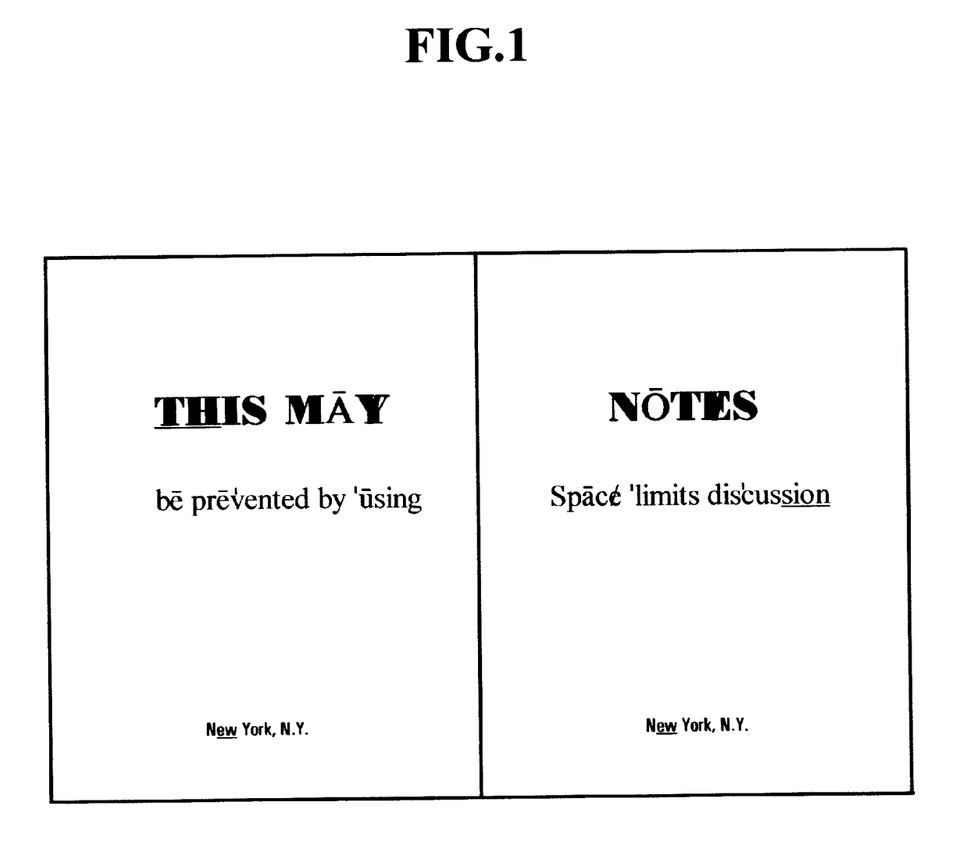
FIG. 1 illustrates pages of the booklet showing varied sizes of print type with markings
Figure 2A:
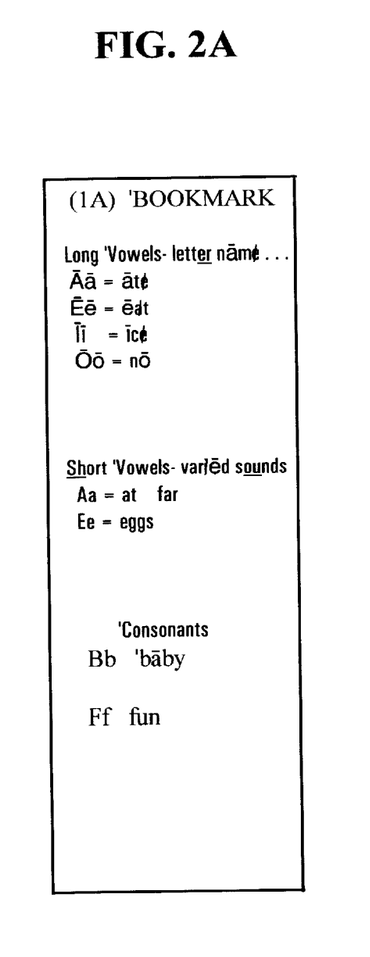
FIG. 2A illustrates side one of the bookmark reference tool that explains and shows correct pronunciation of long vowel, short vowel and consonant sounds with markings
Figure 2B:
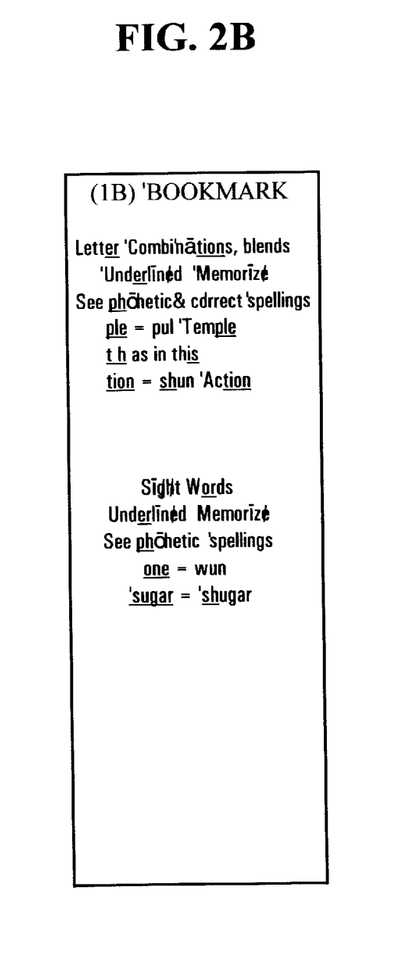
FIG. 2B illustrates side two of the bookmark reference tool that explains and shows correct or phonetic spelling to aid correct pronunciation of special letter combinations including blends and sight words with markings.
Figure 3:
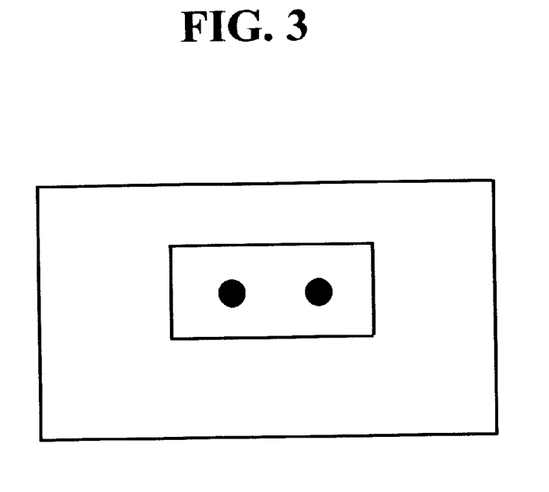
FIG. 3 illustrates a type of retrievable sound storage device, a cassette tape
Figure 4A:
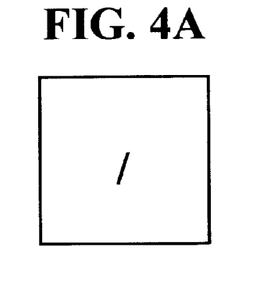
FIG. 4A illustrates the slash as a mark superimposed on silent letters
Figure 4B:
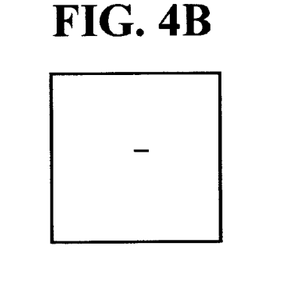
FIG. 4B illustrates the macron as a mark placed over long vowels
Figure 4C:
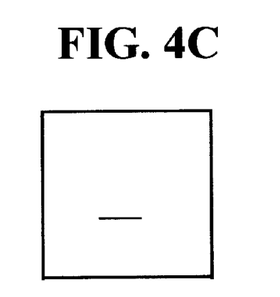
FIG. 4C illustrates the underline as a mark designating letter and word groups that do not decode phonetically
Figure 4D:
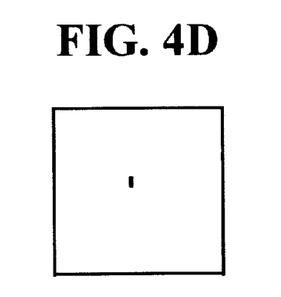
FIG. 4D illustrates the stress mark as a mark designating syllable emphasis

This invention consists of a booklet, as represented in FIG. 1, a bookmark, represented in FIGS. 2a and 2b, and a retrievable sound storage device reference training tool, such as a compact disc, mini disc, or cassette tape, the latter of which is represented in FIG. 3.

Figure 5:
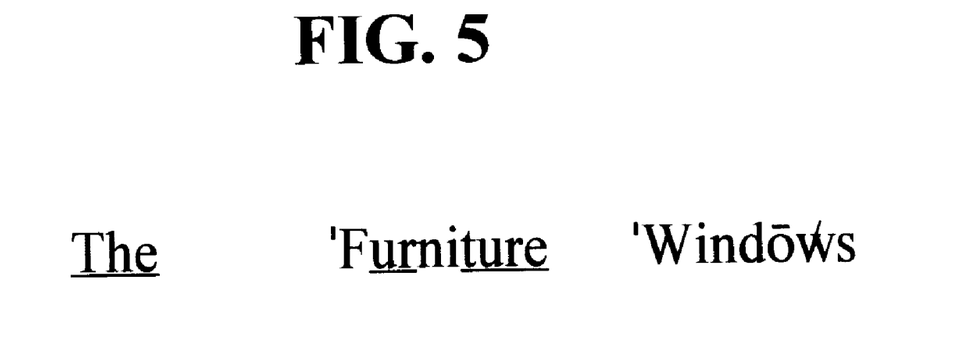
FIG. 5 illustrates the markings of FIGS. 4a–d applied to words

The booklet, represented by FIG. 1, depicts open pages with words and segments of sentences as they would appear in a book or magazine with varied sizes of type ranging from large and bold as can be seen in newspapers, to small and fine as may be found on medicine bottles. Inconspicuous markings represented in FIGS. 4a–d, discussed in detail later, have been applied to each word, as represented in FIG. 5, which markings serve to instruct directly or indirectly in word pronunciation.

The markings guide the reader in knowing what should be done with each letter and word of the written material. The letters and words on the bookmark reference tool are marked with the same markings used in the booklet. The reader matches the letters or words and related markings in the booklet with the same letters or words and markings on the bookmark reference tool. The visually separated categories of marked letters and words on the bookmark are illustrated by FIGS. 2a and 2b, and are discussed in greater detail later. This matching allows the reader to move quickly from specific booklet markings in the categories and groupings of letters and words designated by those markings to categories and groupings with the same markings on the bookmark as a means of reviewing, clarifying and obtaining more precise information about pronunciation of the letters and words.

The markings identify on which syllable the emphasis should be placed, whether vowels are long or short, whether letters should be pronounced or recognized as being silent, or whether the words are sight words or special letter combinations that must be researched by using the bookmark to determine correct pronunciations because their spellings do not support the pronunciations.

Booklet markings seen in FIGS. 4a–d, used in this preferred embodiment were selected for their relative inconspicuousness when used together and in combination with words appearing in regular sentence format such that the text may appear as unmarked when seen at a glance. This feature protects the self esteem of the reader who may use the materials in public, such as on the subway, by making it less likely that the text markings will be noticed and someone question the reader about the reason for their use.

Most of the markings applied to the booklet text are specified as direct markings because they allow immediate action on the part of the reader that will aid pronunciation of letters and/or words, without seeking help from the bookmark reference tool. These markings bring to the text information that normally would be found in standard reference materials, and thereby ease the research burden on the new reader. Two of the marks, the stress mark and the macron, were used in the prior related invention. The stress mark, placed before and/or above a syllable, is used in its regular manner, to indicate syllable emphasis. The macron indicates that the long vowel sound should be given to the vowel. By contrast, the unmarked space above vowels identifies them as vowels to which a short vowel sound is assigned. By further contrast, the absence of a mark associated with a letter that is not a vowel, indicates it is a consonant and should be pronounced in ways consistent with the prior instructional method, as is true also for the vowels.

Two additional marks were selected for use in this invention because the same are readily understood as having the meanings applied herein. The slash is a mark generally known for indicating "do not" as seen on road signs. It is superimposed directly on letters, indicating that they should not be pronounced. The other mark, the underline that often designates something needing special attention, is used to identify those special letter combinations and words, including letter blends, suffixes, sight words, and perhaps even foreign words, which cannot be pronounced using the method of the prior instruction because they do not decode phonetically. They must be researched by using the bookmark to determine pronunciation before being memorized if they are to be spelled correctly. The underline is a type of indirect marking; it leads the reader to other action before correct pronunciation can be ascertained.

The booklet, represented in FIG. 1, usually consists of black or dark letters, words and sentences printed on a white or contrasting paper background. The size of the print type used in the booklet ranges from large and bold, to small and fine. The size and weight of paper is that normally used for letters, 8½"×11", set with the longer side being the top, and a somewhat heavier but flexible paper serving as the cover. Two or more sheets of paper, cover included, comprise the booklet pages, and are imprinted on both sides. The pages are fastened in the middle, vertically, with staples or other fasteners, so that the size of each page, approximately 5½"×8½", is half of the size of the total page when folded left over right, into the form of a booklet. This gives the booklet a total of approximately 8 (or more) pages, depending on the number of sheets used, which number includes the front and back sides of the cover. There may be a drawing or picture on the front cover that relates to the booklet topic. As space permits, some or all of the information appearing on the bookmark may be duplicated in whole or in part in the booklet, preferably on the inside cover, to serve as a backup for the bookmark should it be misplaced inadvertently.

The design of the booklet aims to protect the self esteem of the older reader. A great many of the books for new readers are intended for children as can be seen in the use of brightly colored text and pictures or have content that is uninteresting for youths and adults. This booklet is plain in appearance to avoid attracting the attention of others, which avoids embarrassment to the user. It is written on a level appropriate for youth and adult readers with interesting content that is not childish. This prevents demeaning the older person whose concerns are different from that of the child.

Also, the design of the booklet in this embodiment, discourages the use of pictures and color in the body of the booklet. Either would tend to draw the attention of others to it, thereby defeating the intent of inconspicuousness that protects the reader from questioning or from unwanted attention from others. Also, the purpose of these reference training materials and tools is to further the development of phonics based reading skills consistent with the method of the prior instruction. The presence of pictures would represent a distraction to the reader and may serve to weaken phonic skills by turning the reader's focus to visual clues.

Figure 6:
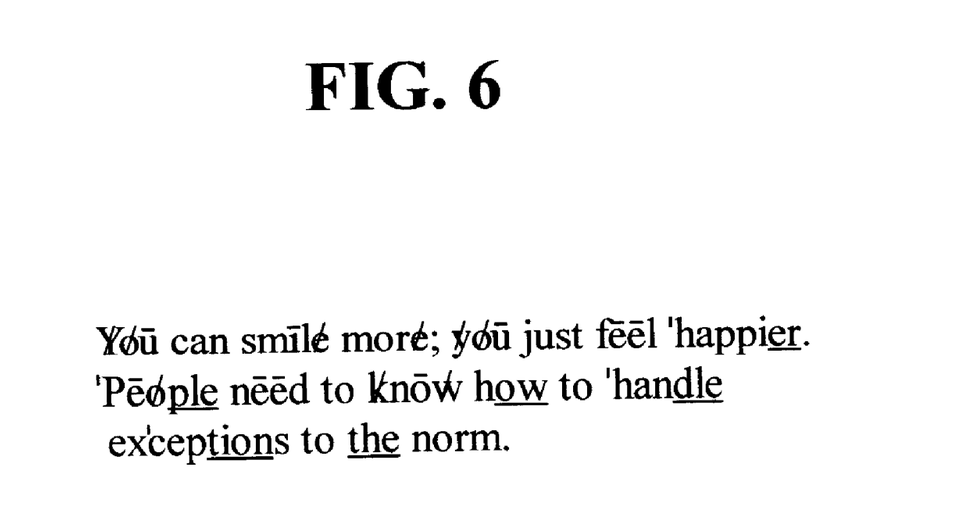
FIG. 6 illustrates the sentence format of the booklet with markings applied to the words

The booklet's sentence format, as represented in FIG. 6, encourages the reader to move from one word to the next word in order to complete the thought. This focus on capturing thoughts rather than focusing on isolated words only, is seen as being more motivational in holding the interest of the reader than is the simple review of single words arranged in list or similar format. Again, the independent user needs as many sources of motivation as possible to realize the goals of reading fluency and adeptness at using reference tools.

The bookmark reference training tool represented in FIGS. 2a and 2b, that is designed for use with the booklet, is about one half the size of the booklet page, approximately 2¾"×8 ½". It is constructed of material heavier than that used in the booklet and can be made of paper, cardboard, plastic, fabric, or other such flexible material all of which are light colored, with the color being different from that of the booklet pages, and imprinted with dark colored letters and words on both sides. The bookmark is temporarily attached to booklet pages so that it can be removed, observed and moved about as the book is being read, then later attached within the book for storage. Paper clips or other temporary attaching devices, are suitable for accomplishing this objective.

On one side of the bookmark, represented by FIG. 2a, upper and lower case letters of the three groups of long vowels, short vowels and consonants, are alphabetically arranged as letter sets in separate visual fields. Written reminders pertaining to pronunciation of the vowels are added to each of the long and short vowel groupings. Adjacent each letter set, a word is written that incorporates the sound of that vowel or consonant when spoken in the word, thereby illustrating correct pronunciation of each. Consonants with one sound each are to be sounded just as they appear in the word. When there is more than one pronunciation of a short vowel or consonant, additional words are shown on the bookmark that illustrate the variations of the letter's pronunciation. The information pertaining to long vowels, short vowels, and consonants was taught in the prior instruction and is therefore considered as "old" information. It is organized visually on one side of the bookmark because it may not be needed by the astute reader who has good recall of the prior instruction. In this way, that "old" information can be kept out of sight.

The reverse side of the bookmark, represented by FIG. 2b, shows the two groupings of special letter combinations including letter blends, and sight words and include all such letters and words found in the booklet text. These share a similar marking, which in this embodiment is the underline. Explanations are written atop the two groupings reminding readers that these letters such as "TION," and "TH," and words such as "ONE," do not decode phonetically and must be memorized because the correct spelling of each does not follow the rules for phonetic decoding as taught in the prior instruction. They are listed alphabetically with the special letter combinations appearing in a visual field separate from the sight words. Beside the special letter combinations, there are written phonetically spelled words illustrating the sounding of each and/or a correctly spelled word that incorporates the sound of the special letter combination. Likewise, adjacent each sight word, a phonetically spelled word is written that illustrates the correct sounding of the sight word. Because the information pertaining to special letter combinations and sight words, except for a small sampling, was not taught in the prior instruction, it is considered as "new" information. Referral of the reader from the booklet to this information on the bookmark provides one of the major activities of reference training for which the bookmark and booklet were designed.

By separating the "old" and "new" information and placing them on different sides of the bookmark, the side showing the "new" information, can be placed face up adjacent the page being read. Then, the reader can move rapidly through the booklet text by following the direct markings of the text and consult the bookmark for new information only. The reference exercise would be reduced to a shift in eye movement rather than one of flipping the bookmark and searching both sides for information as may be required by readers who have less recall of the prior instruction.

Both the organization of the information and the use of a tool that brings the reference information into close proximity to the booklet text by that information being placed on a moveable bookmark, further ease the research burden. When these features are combined with the marking of the text for immediate action and the alphabetizing, one sees that training in the use of reference materials is made easy and quick.

The sound storage device, represented in FIG. 3, and referred to hereafter as the "tape", consists of a prerecorded straight through reading of the booklet text that helps the reader evaluate progress in achieving fluency and will be explained in greater detail during discussion of the method. It is thought that using it with a small pocket sized tape player having an earplug type device will allow the greatest amount of freedom in controlling its volume.

Initially, the reader attempts to read the headings and other large print of the booklet text slowly, before moving to the standard type, using skills gained in the prior instruction. This is done while observing the direct markings and executing the actions associated with each including placing emphasis on the correct syllable. If the reader has forgotten how to pronounce some vowels or consonants, the bookmark reference tool would be consulted. The letter that cannot be sounded in the text will be noted and classified as a long vowel if the vowel is marked, or short vowel if it is unmarked, or consonant if the letter is an unmarked non vowel. The same letter is then identified on the bookmark in the appropriate grouping, whereby pronunciation is determined by pronouncing the word written adjacent the letter and listening for the sound of the specific problem letter as the word is spoken. The letter sound is held in memory mentally, while the reader goes back to the word in the booklet where the difficulty occurred. The letter sound that presented a problem is inserted in the word, after which the word or word segment including that sound, is spoken aloud several times, if feasible. The reader then adds the next letter sound in the same way until the entire word, sentence or paragraph has been read.

When a problematic special letter combination or sight word is encountered in the booklet, the reader consults the bookmark, observing where the mark identifying the letter or word grouping matches the same mark in the booklet text. The reader searches the alphabetically arranged lists in the specific letter or word grouping on the bookmark, finds the letters or words matching the ones that are presenting problems in the booklet text, observes and pronounces the correctly spelled or phonetically spelled word that contains the desired pronunciation which is written adjacent the letters or word in question, holds that pronunciation in memory, returns to the site in the booklet where the problem occurred, and inserts that pronunciation into the reading of the booklet text. The text is then read and reread as a means of gaining confidence in pronunciation.

Additional words in the sentence are sounded and read in the same way according to the steps named above. The complete sentence, represented in FIG. 6, is then read audibly if possible, depending on the person's surroundings, or silently, if audible reading would present embarrassment. Attention to protection of the person's self esteem is interwoven with the design and use of these materials.

In reading the word "wind$\overline{o}$ws" according to the markings, as shown in FIG. 5, the reader would identify "w" as an unmarked non vowel, and classify it as a consonant. By consulting the bookmark grouping of "Consonants", the "w" would be found listed alphabetically, and the adjacent word "will" would be seen and pronounced with the reader listening for, and hearing, the "w" sound within the word. That sound would be inserted as the first sound in the word. The short "i" follows, with the reader again seeing the vowel and understanding that by it being unmarked, it is classified as short. By checking the grouping of "Short Vowels" on the bookmark reference tool, the reader sees and selects the usual short "i" sound heard when the word "it" is pronounced and inserts that as the second sound in the word. All other letters would be sounded in order, each having only one sound including the long vowel "ō" marked with the macron, except for the second "w̸" with the superimposed slash appearing, that indicates that it should not be sounded at all. The stress mark preceding the fist syllable "win" would indicate it as the one to be given emphasis. If this had been the word "'Pēøple" as in FIG. 6, it would have been sounded in the same manner, first the consonant "p", then the long vowel "e", the "ø" would have been omitted. The underlined special letter combination "ple" would have been researched by finding that grouping on the opposite side of the bookmark and matching the booklet "ple" with the 37 ple" as it appears on the bookmark. The phonetic word "pul" written beside "ple" on the bookmark would indicate that sound as the one the reader would add to the previous "p" and "ē" to complete the word. The stress mark preceding the first syllable "'Pē" would indicate it as the one to be given emphasis. Additional words in the sentence would be sounded in the same way. Then the complete sentence, represented in FIG. 6 would be read audibly if possible, or silently, depending on the person's surroundings, as best protects the person's privacy and self esteem.

Reading a minimum of three sentences weekly has been found sufficient to prevent forgetting the phonetic code learned in the previous related instructional method and as a means of developing fluency. Reading as much as possible and as often as possible from the booklet materials is recommended as a means of hastening development of fluency and ease in using reference tools.

Readers are encouraged to read first the headings, words and sentences from the booklet that are written in large print and bold type. Doing this enables them to make faster progress in completing a sentence than would occur with reading smaller print. One sentence read may appear as a paragraph giving the impression of a large volume of words having been mastered. Because the booklet and reference tools are intended for independent use, the varied size type proves useful as a means of maintaining motivation throughout the training period. Also, adults who comprise one of the groups for whom this invention is designed, often find it easier to see larger letters. Additionally, the markings associated with larger letters are easier to identify than would be true with smaller letters, another factor easing the overall burden of learning.

The booklet and bookmark serve a four fold purpose. First, using the booklet with the bookmark trains the reader to move between the text being read and other sources of information in development of reading skills. Also, the bookmark information is marked or matched with the same type markings found in the booklet, as seen in FIGS. 4*a*–*d*. This matching feature makes it easy for the reader to switch quickly from one to the other with the least amount of frustration. Second, by learning to use markings such as the stress mark and macron, of this embodiment, that are identical to those found in some formal reference tools such as the dictionary, the reader practices not only the action of seeking reference information when necessary, but gains skill in understanding the meaning of the reference information that will be used later on a regular basis. Third, the information related to letters and sight words that appears on the bookmark, is arranged in groups and alphabetically. When using the bookmark, the reader is being trained automatically to locate information that is written in alphabetical order. Familiarity with alphabetical arrangement of letters and words will be needed by the reader later when searching for words in one of the standard reference tools, the dictionary. This feature of transferability, makes transition to standard tools much easier. Fourth, the bookmark that shows the phonetic spelling of the correct pronunciation of letter combinations and sight words demonstrates the legitimate use made of phonetic spelling skill learned in the prior instruction and resembles phonetic spellings found in standard reference resources such as the dictionary, thus demonstrating another feature of transferability of the reference tools of this invention.

Also, the presentation of different groupings of information on the bookmark, i.e. long vowels, short vowels, consonants, special letter combinations including letter blends, and sight words, in different visual fields, serves to keep the reader organized in thinking about the similarities and differences between those categories of letters and words. This speeds the process of finding specific information, and is thought to hasten the learning process overall while contributing toward making the bookmark handy and easy to use.

After the reader has obtained the information necessary for correct pronunciation of words from the booklet and bookmark, and has practiced reading the booklet sentences repeatedly, the tape is used for evaluating fluency, specifically speed and smoothness in moving from one word to another. The recording on the tape, does not provide verbal instructions. The booklet text is read softly along with the recording. The fluent reader will give proper treatment to sentence punctuation such as the need for dropping the voice at the end of a sentence when encountering a period, giving the voice inflection peculiar to a question mark or exclamation point, and pausing for a comma. When the reader can read softly along with the recording, and such reading approximates the reading speed, smoothness, and voice inflection heard on the tape, the reader can be confident of having achieved fluency as determined by an objective indicator. The objective indicator is necessary because many times readers coming from past reading failure, think that a stumbling pattern of "calling words" will suffice for reading achievement because it represents progress when compared with their skills in the past. This audio device helps readers measure their progress until the actual goal of fluency has been achieved.

It is important that the read-along reference tool, the tape, not be used as the means of making decisions about how words should be pronounced instead of using the booklet markings and bookmark for that purpose. On rare occasions with a particularly peculiar anomaly of the language, the tape may be of assistance in providing correct pronunciation, however the reader must be thoroughly cautioned against using it for purposes of determining word pronunciation primarily. Otherwise, phonetic reading skill development will be subverted by the reader learning to look at whole words, hear the sound of the words, then memorize the order of the letters without understanding specific information about the sound of individual letters that justify construction of most words, or how phonetic spelling is used to aid in pronunciation of words and letters that do not decode phonetically. Resorting to such a "shortcut" will place the reader back at the beginning of reading problems where all if not most words were memorized. Instead, the reader should seek to develop skill in using the markings on the booklet pages and bookmark reference training tool. The read-along recording is intended as a tool for objectively evaluating fluency.

Some readers with very limited vocabularies may choose to listen to the recording before using the booklet as a means of familiarizing themselves with the sounds of new words. If a preview listening is desired, it should be discontinued before the actual reading of the booklet text during which, the reader practices using the booklet with the bookmark reference tool. Use of the recording should resume after the reference training with the booklet and bookmark, and be used for the purpose specified.

The markings selected in this embodiment do not represent the full range of markings that can be used for accomplishing the same purpose. The reverse slash (\), and other markings which qualify as inconspicuous could be used without changing the purpose of the invention when used with an adult population. On the other hand, the booklet with sentence format and training tools could be adapted for use by young children who have not suffered damage to their self esteem. They could benefit from having reading materials written on the child's level that help develop fluency while training in the use of reference tools. They would not need the measures of inconspicuous markings and plainness in the booklet design as described. Adapting the materials and tools for use by such children could be done by adding color to the pages and/or to the text, and by changing all or some of the inconspicuous markings to conspicuous ones. If the stress mark and macron were left in tack, they could be disproportionately enlarged and/or colored brightly. Silent letters could be circled or marked in other ways. The special letter combinations including letter blends and sight words that do not decode phonetically, could be colored differently than the regular text. However, the use of pictures in the body of the text or on the bookmark would be discouraged for reasons cited earlier. Rather than having one bookmark, multiple bookmark type devices could be designed that could be used with some of the six groupings of letters and words, each selected grouping having its own bookmark. In addition to the bookmark showing samples of phonetic spellings of words that explain pronunciation, it could incorporate cut out areas that are silhouettes of the letter combinations, sight words, etc. and would be placed directly over the word in the booklet to keep the child focused on the "problem" letter sound(s) and further the child's understanding of the reference tool concept. Other modifications could be made while keeping intact the basic design of the booklet with reference tools.

This invention should not be limited by the specific description of markings and materials or appearance of the tools as cited earlier. Specifications of the present embodiment and accompanying drawings should be considered as illustrative and not exhaustive or limiting the precise forms of the invention. It should be considered that modifications and variations of the invention could be made without departing from the scope and spirit of the present invention, and the appended claims would be covered by such considerations.

I claim:

1. Reference training tools comprising a main text in the form of a booklet, a bookmark, and an audio storage device, in which:
A. the booklet consists of:
 1. pages and cover imprinted with type varying in size from large and bold to small and fine comprising letters and words, written in sentence format;
 2. letters and words to which marks have been assigned which markings guide and instruct in word pronunciation, and identify:
  a. a vowel that should be pronounced as long marked with a mark assigned to long vowels, illustrated by a macron placed over said vowel,
  b. letter combinations and words that need to be researched further as a means of determining their correct pronunciation, marked with a mark assigned to said letter combinations and words, illustrated by a line drawn under said letter combinations and words,
  c. a letter that should not be pronounced which is called a silent letter, marked with a mark assigned to silent letters, illustrated by a slash through said letter,
  d. a syllable that should be emphasized, marked with a mark assigned to syllables that should be emphasized, illustrated by a stress mark placed before and above said syllable;
 3. letters to which markings have been assigned that further instruct in word pronunciation, the markings of which are by contrast with the markings and letters named in step 2, and identify:
  a. a vowel that should be pronounced as short, so indicated by being contrasted with a long vowel wherein the mark assigned the long vowel is absent, illustrated by an unmarked space over said vowel,
  b. a consonant as a letter that by contrast with vowels is a non vowel, and further contrasted with marked vowels, by the mark assigned the long vowel being absent, illustrated by an unmarked space over said letter;
 4. said markings applied to letters and words having features including:
  a. selected marks being readily understood through general familiarity with their meaning in public use, and
  b . usefulness in supplying information directly to the text that would otherwise need to be obtained by consulting standard reference materials; and
 5. text of said bookmark written inside the booklet;
B. the bookmark consists of:
 1. material of heavier weight and of a different color than pages of said booklet, on which letters and words are imprinted in list format;
 2. letters written in both uppercase and lowercase that are grouped in separate categories, which categories are named as long vowels, short vowels, and consonants, wherein the letters in each category are arranged alphabetically, and each of said categories is placed in a visual field separate from the other categories, with each visual field arranged in proximity to the others;
 3. letter combinations and words that need to be researched further as a means of determining correct pronunciation of each, separated further, whereby letter combinations are grouped in a category designated as special letter combinations, and words are grouped in a category designated as sight words defined as words pronounced in ways not supported by the spelling of said words, wherein said letter combinations and said words are arranged alphabetically within each category, and each of said categories is placed in a visual field separate from the other, with each visual field arranged in proximity one to the other;
 4. markings applied to letters and words named in steps 2 and 3 which are identical to markings and indicators applied to the same letters, letter combinations, and words in the booklet, which markings serve to direct in pronunciation of said letters and words including:
  a. a vowel that should be pronounced as long, marked with a mark assigned to long vowels, illustrated by a macron over said vowel, b. a vowel that should be pronounced as short, marked by contrast with a long vowel, whereby the mark assigned to long vowels is absent, illustrated by an unmarked space over said vowel, c. a letter that should be pronounced as a consonant marked by contrast with vowels identified as long, whereby the mark assigned to long vowels is absent, and further indicated by said letter not being a vowel, illustrated by an unmarked space over said letter;

d. letter combinations and words that need to be researched further as a means of determining correct pronunciation, marked with a mark assigned to said letter combinations and words, illustrated by a line drawn under said letter combinations and words;

5. additional marks applied to letters and words that are identical to markings applied to letters and words in the booklet, which markings further serve to direct pronunciation of said letters and words, which markings include:

a. a letter that should not be pronounced, called a silent letter, marked with a mark assigned to silent letters, illustrated by a slash through said letter, b. letters comprising syllables that should be emphasized, marked with a mark assigned to syllables that should be emphasized, illustrated by a stress mark placed adjacent and above said syllable;

6. a word written adjacent each long vowel, short vowel, and consonant named in step 2, that contains the sound of said letter and illustrates the correct pronunciation of said letter when said word is pronounced, and additional words written adjacent said vowels and consonants illustrating each sound assigned to said vowels and consonants;

7. a word written adjacent each special letter combination and each sight word named in step 3, that illustrates correct pronunciation of said special letter combination and said sight word when the word that is written adjacent is pronounced;

8. additional words written adjacent each special letter combination and each sight word named in step 7, that illustrate correct pronunciation of said special letter combinations and said sight words when the words that are written adjacent are pronounced;

9. instructions for using the bookmark written atop categories of letters and words;

C. the audio storage device on which a straight through reading of the text of the booklet has been prerecorded, on which recording is heard:

1. pronunciation of words being read at a speed indicative of fluency, 2. smoothness in transitioning from one word to another, and 3. voice inflection that correctly interprets punctuation marks in the text.

2. The booklet and bookmark of claim 1, having features of inconspicuous in the use made of them for youth and adult readers, demonstrated in:

A. the choice of selected markings applied to letters and words whereby the text appears as unmarked when viewed at a glance by onlookers, and B. text of the booklet written in sentence format having correctly spelled words that resembles general reading materials of youth and adult readers.

3. Reference training tools of claim 1 whereby placement of categories of letters and words on the bookmark is determined in part by comparison of the letters and words that appear in the booklet text, the pronunciation of which was taught in prior related instruction, with letters and words that appear in the booklet text, the pronunciation of which was not taught in prior related instruction, wherein:

A. information considered as "old" correlates with information taught in prior instruction, is placed on one side of the bookmark, illustrated by a list of long vowels, short vowels, consonants, with words written adjacent each that contain sounds of said letters, and B. information considered as "new" correlates with information not taught in previous instruction, is placed on the opposite side of the bookmark from said "old" information, illustrated by an expanded list of special letter combinations and sight words, with words written adjacent each that contain sounds of correctly pronounced said letter combinations and said sight words.

4. A method of reducing reference search activity through the use of reference training tools of claim 1 wherein the reader:

A. recalls sounds of long vowels, short vowels, and consonants, which information is categorized as "old" information on the bookmark;

B. omits viewing the bookmark side on which is displayed "old" information, illustrated by a listing of vowels and consonants with words adjacent;

C. selects for viewing, the bookmark side on which is displayed "new" information, illustrated by marked special letter blends and marked sight words defined as words, the pronunciation of which is not supported by the spelling of the same, with words written adjacent said special letter combinations and said sight words;

D. places adjacent the booklet page being read, the bookmark showing the mark used to identify information that must be researched further before correct pronunciation can be achieved with the "new" information displayed;

E. reads letters and words in the booklet pronouncing the same until letters and words that cannot be read are seen, which letters and words are marked with the mark assigned to information that must be researched to gain understanding of correct pronunciation of the same, illustrated by a line drawn under said special letter combinations and said sight words;

F. shifts the eyes from the marked booklet text of step E to identically marked letters and words on the bookmark, where words are written adjacent said special letter combinations and said sight words that illustrate correct pronunciation of said special letter combinations and said sight words, pronounces the word written adjacent said special letter combination or said sight word that could not be pronounced, holds in memory the sound of said word pronounced, returns to the sentence in the booklet where said special letter combination or said sight word appeared, inserts the sound of said word pronounced, and proceeds with reading the word and sentence; and G. repeats steps A–F until the desired number of sentences, paragraphs or pages in said booklet are read.

5. The booklet and bookmark of claim 1 having features requiring skills and understanding exercised in using the bookmark that are transferable to other reference sources, which features include:

a. alphabetization of letters and words named in steps 2 and 3, b. categorization of letters and words named in steps 2 and 3,
c. marking of letters and words that match identically marked letters and words used in a main text,
d. marks applied to some of the letters and words that have the same appearance and use as identical marks applied to letters and words of a standard reference source;
e. phonetic spelling illustrating pronunciation of special letter combinations and correctly spelled words in a main text; and
f. information needed for understanding the main text placed in a source separate from the main text, the bookmark, which placement makes search in a separate source necessary.

6. A method of developing reading fluency by using reference training materials and tools which method consists of:
   A. providing to a reader, a main text called a booklet, a bookmark, and a pre-recorded audio storage device;
   B. directing the reader to read the booklet by following actions indicated by marks applied to letters and words directly and by contrast, which markings guide the reader in recalling previous instruction and in pronouncing said letters and words, including:
      1. pronouncing a vowel as long that is marked with a mark assigned to long vowels,
      2. pronouncing a vowel as short that is marked as short by it being contrasted with a long vowel, wherein the mark assigned to long vowels is absent,
      3. pronouncing a letter as a consonant which letter is marked as a consonant by contrast wherein the mark assigned to long vowels is absent, and by further contrast with a vowel, said letter is seen to be a non vowel,
      4. omitting pronunciation of the letter that is marked with a mark assigned to silent letters,
      5. placing emphasis on the syllable that is marked with a mark assigned to syllables that should be emphasized;
   C. reading the large print before reading the small print;
   D. directing the reader to continue reading the booklet until a letter is seen that cannot be pronounced by using the instructions of step B, whereupon the reader will:
      1. make mental note of the letter and mark assigned to said letter that identifies said letter as a long vowel,
      2. look at the bookmark until the same letter with an identical mark as that of the letter in the booklet is seen, which letter appears on the bookmark in the category of alphabetically arranged long vowels written in upper case and lower case, adjacent which, words are written,
      3. read aloud the word written adjacent said letter and listen to the sound of said letter when said word is pronounced,
      4. hold in memory the sound of said letter heard in step 3,
      5. return to the booklet text where the sound of said letter is inserted at the place where said letter that could not be pronounced, was first seen, and
      6. say aloud the word containing the sound in step 5, a plurality of times;
   E. directing the reader to continue reading the booklet until a letter is seen that cannot be pronounced by following steps B and D, whereupon the reader will:
      1. make mental note of the letter marked by contrast, whereby said letter is identified as a short vowel,
      2. look at the bookmark until the same letter with an identical marking by contrast as that of the letter in the booklet is seen, which letter appears on the bookmark in the category of alphabetically arranged short vowels written in uppercase and lower case, adjacent which, words are written,
      3. read aloud the words written adjacent said letter and listen to the sounds of said letter when each of said words is pronounced, and select one of said letter sounds,
      4. hold in memory the sound of said letter selected in step 3,
      5. return to the booklet text where the sound of said letter, that was held in memory, is inserted at the place where said letter that could not be pronounced, was first seen,
      6. repeat steps 3 through 5 until the reader accepts one of the letter sounds, and
      7. say aloud the word containing the sound selected in step 5, a plurality of times;
   F. directing the reader to continue reading the booklet until a letter is seen that cannot be pronounced by following steps B, D and E, whereupon the reader will:
      1. make mental note of the letter marked by contrast, wherein the mark assigned the long vowel is absent, and by further contrast with a vowel, said letter is seen as a non vowel, and thereby identified as a consonant,
      2. look at the bookmark until a letter identical to said letter is seen on the bookmark written in upper case and lower case in the category of alphabetically arranged consonants, adjacent which, words are written,
      3. read aloud the words written adjacent said letter and listen to the sound of said letter as each of said words is pronounced, and select one of said letter sounds,
      4. hold in memory the sound of said letter selected in step 3,
      5. return to looking at the booklet text where the sound of said letter, that was held in memory, is inserted at the place where said letter that could not be pronounced, was first seen,
      6. repeat steps 3 through 5 until the reader accepts one of said letter sounds, and
      7. say aloud the word containing the sound selected in step 5, a plurality of times;
   G. directing the reader to continue reading the booklet until a marked letter combination is seen, which mark indicates that said letter combination needs to be researched further before it can be pronounced correctly, whereupon the reader will:
      1. look at the bookmark list of identically marked and alphabetically arranged letter combinations named and categorized on the bookmark as special letter combinations, until the identical letter combination as seen in the booklet is seen on the bookmark, adjacent which, words are written illustrating correct pronunciation of said special letter combination
      2. read aloud the words written adjacent said special letter combination and listen to the sound of said special letter combination as said words are pronounced,
      3. hold in memory the sound of said word illustrating correct pronunciation of said special letter combination heard in step 2,
      4. return to looking at the booklet text where said special letter combination was seen, and insert pronunciation of said word held in memory at the place where the marked letter combination was first seen, 5. say aloud the word containing said pronunciation in step 4, a plurality of times;

H. directing the reader to continue reading the booklet until a marked word is seen which mark indicates that said word needs to be researched further before it can be pronounced correctly, whereupon the reader will:
  1. look at the bookmark list of alphabetically arranged marked words which are named and categorized on the bookmark as sight words defined as words whose correct pronunciation is not supported by the arrangement of the letters of said words, and see on said bookmark the identical marked word as seen in the booklet, adjacent which, a word is written, illustrating correct pronunciation of said sight word,
  2. read aloud said word written adjacent said sight word and listen to the sound of said word as it is pronounced,
  3. hold in memory the sound of said word read aloud in step 2, and
  4. return to looking at the booklet text where the sound of said word that was read aloud in step 2, and held in memory, is inserted at the place where said marked sight word, was first seen,
  5. say aloud said sight word in the booklet that has the sound of said word that was read aloud in step 2, a plurality of times;

I. directing the reader to read a minimum of three sentences from the booklet each week, as described in steps B–H until the student is able to read paragraphs and pages with smoothness in moving from one word to the next, while simultaneously giving inflection to the voice that is consistent with punctuation marks of the text;

J. directing the reader to play the audio device on which a straight through reading of the text of the booklet has been prerecorded, and read along with the prerecorded reading until the student can match elements of the recording that measure objectively the student's achievement of fluency, which elements are:
  1. the speed at which words are pronounced,
  2. the smoothness of transitioning from one word to the other, and
  3. the inflection of the voice that correctly interprets punctuation marks in the text.

7. A method of training readers in the use of phonetic spelling wherein phonetically spelled words are written adjacent selected special letter combinations and sight words, defined as words pronounced in ways not supported by the spelling of said words, on a bookmark accompanying a main text having identical special letter combinations and sight words whereby said phonetically spelled words illustrate correct pronunciation of said special letter combinations and said sight words when correctly spelled words cannot be used to illustrate correct pronunciation of said special letter combinations and said sight words, whereby the reader, on seeing said special letter combinations and said sight words in said main text, finds identical special letter combinations and sight words on said bookmark and substitutes pronunciation of said phonetically spelled words for said special letter combinations and said sight words being read in said main text.

* * * * *